United States Patent [19]

Butler

[11] 4,440,120
[45] Apr. 3, 1984

[54] COMPACT RAM TUBE ENGINE AIR INTAKE MANIFOLD

[75] Inventor: Paul E. Butler, Lansing, Mich.

[73] Assignee: General Motors Corporation, Detroit, Mich.

[21] Appl. No.: 381,076

[22] Filed: May 24, 1982

[51] Int. Cl.³ .............................................. F02B 75/22
[52] U.S. Cl. ........................ 123/52 MV; 123/52 MC; 123/52 M; 123/55 VF; 123/55 VS
[58] Field of Search ........ 123/52 MC, 52 MV, 52 M, 123/55 SR, 55 R, 55 VF, 55 VS, 55 VE

[56] References Cited

U.S. PATENT DOCUMENTS

| 2,837,074 | 6/1958 | Ransom | 123/379 |
| 2,845,911 | 8/1958 | Gill | 123/52 MV |
| 2,915,049 | 12/1959 | Armstrong | 123/52 MV |
| 2,927,564 | 3/1960 | Turlay et al. | 123/52 MV |
| 3,783,845 | 1/1974 | Brandstetter | 123/55 VE |
| 4,111,163 | 9/1978 | Ederer et al. | 123/52 MV |

FOREIGN PATENT DOCUMENTS 253305 4/1967 Austria .

Primary Examiner—Craig R. Feinberg
Assistant Examiner—David A. Okonsky
Attorney, Agent, or Firm—Robert J. Outland

[57] ABSTRACT

A compact ram tube plenum type intake manifold for a V-type internal combustion engine comprises a generally barrel shaped housing mountable between the engine cylinder banks and defining a compact space in which ram intake passages are interdigitally coiled around the periphery of the walls with remaining portions of the interior space being utilized as an intake plenum. Manufacture in separable sections and other features are also provided for.

5 Claims, 9 Drawing Figures

COMPACT RAM TUBE ENGINE AIR INTAKE MANIFOLD

TECHNICAL FIELD

This invention relates to engine intake manifolds and more particularly to manifolds of the, so called, ram tube type. In a specific embodiment the invention relates to a compact ram tube plenum type intake manifold for V-type internal combustion engines.

BACKGROUND

The prior art relating to internal combustion engines contains numerous examples of plenum type ram tube intake manifolds designed to provide optimum breathing characteristics for supplying intake air charges to the cylinders of internal combustion engines. Such manifold arrangements have been applied primarily to engines having port or cylinder fuel injection and spark or compression ignition where the fuel charge is not required to pass through manifold runners, or ram tubes, of extensive length in order that deleterious effects upon fuel delivery and distribution may be avoided.

While the specific designs of intake manifolds may vary for differing engine applications, the common elements of ram tube plenum type manifolds include one or more intake plenums or air chambers into which intake air is received and from which individual intake runners, or ram tubes, extend to the intake ports of the engine cylinders. The size of the plenum or plenums and the length and cross-sectional area of the ram tubes are selected in accordance with recognized resonator concepts, supplemented by performance testing, to provide resonant tuning of the intake charges that accentuates specific desired breathing characteristics to obtain desired or optimum performance of the specific engine involved. The location and configuration of elements of the manifold structure may be varied to suit the circumstances of the engine and engine compartment design, including the size and location of available space. It is noted however that most such prior art manifold designs have required considerable space in the engine compartment for their application to automotive engines.

SUMMARY OF THE INVENTION

The present invention provides a novel ram tube plenum type manifold concept applicable to V-type internal combustion engines wherein the manifold design is particularly compact for mounting within the V-shaped space defined by the opposite engine cylinder banks.

In preferred form, the manifold includes outer walls of partly cylindrical configuration that enclose a barrel like space in which are contained both a common plenum chamber and the individual ram tubes leading from the plenum chamber to the intake ports of the engine cylinders. The ram tubes are peripherally coiled immediately in-board of the outer walls of the barrel like space and are interdigitated to direct intake flow from the plenum in paths of oppositely curving sense to the cylinder inlet ports of the opposed cylinder banks.

An air intake connection is provided at one end of the plenum chamber and provision may be made for the addition of recirculated exhaust gas to the inlet charges. Connection with the engine cooling system may also be provided to aid overall compactness of the engine package. Preferably the manifold is constructed of two major sections, individually cast or fabricated and machined, in order to facilitate the manufacture, assembly and installation of the unit.

These and other features and advantages of the invention will be more fully understood and appreciated from the following description of a preferred embodiment and engine application, taken together with the accompanying drawings.

BRIEF DRAWING DESCRIPTION

DETAILED DESCRIPTION

Figure 1:
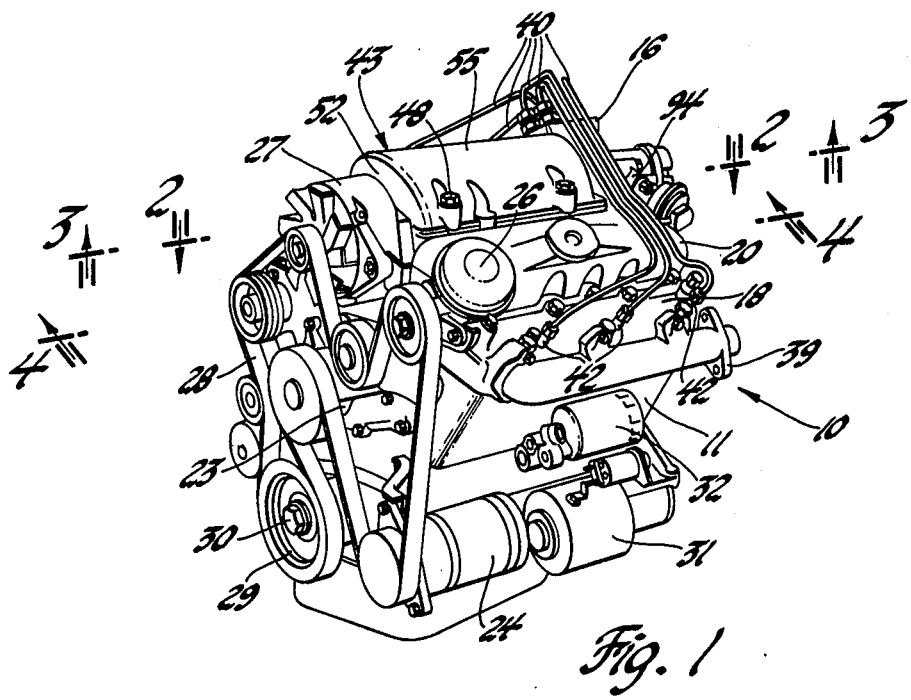
FIG. 1 is a pictorial view of a five cylinder V-type diesel engine assembly having a compact intake manifold in accordance with the invention.
Figure 2:
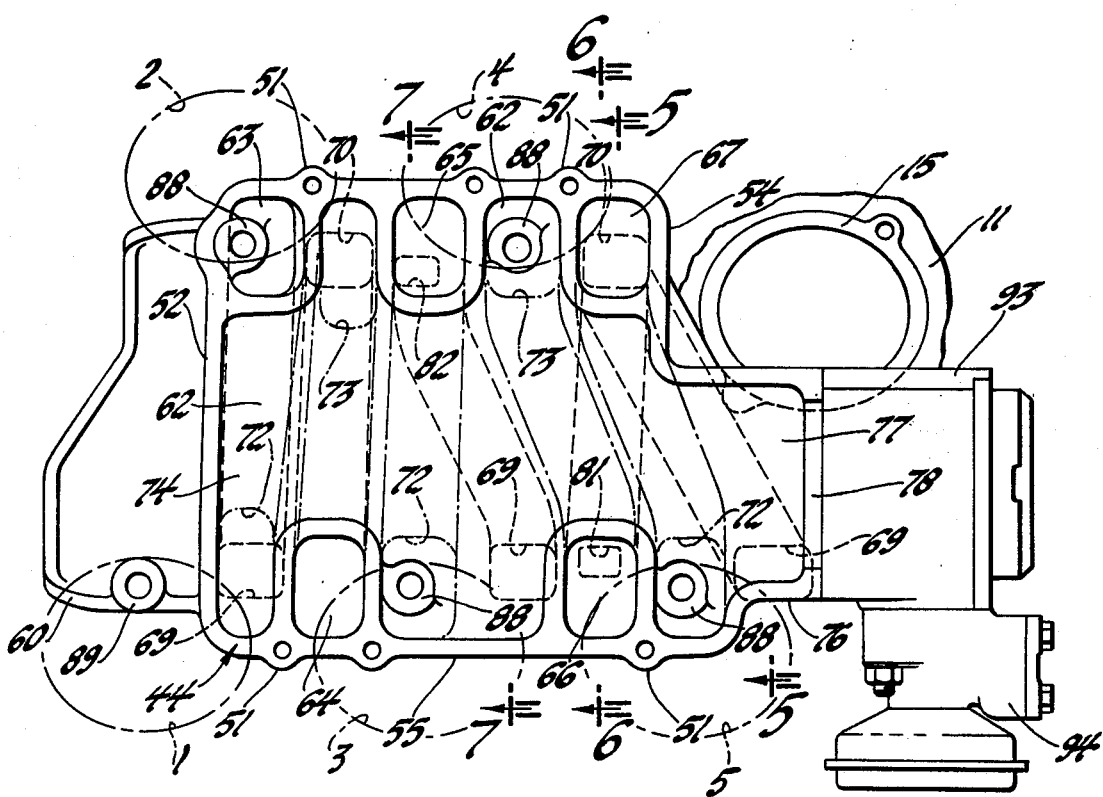
FIG. 2 is a cross-sectional view downwardly from the plane indicated by the line 2—2 of FIG. 1 illustrating the manifold lower portion and indicating the ram tube passage positions.
Figure 3:
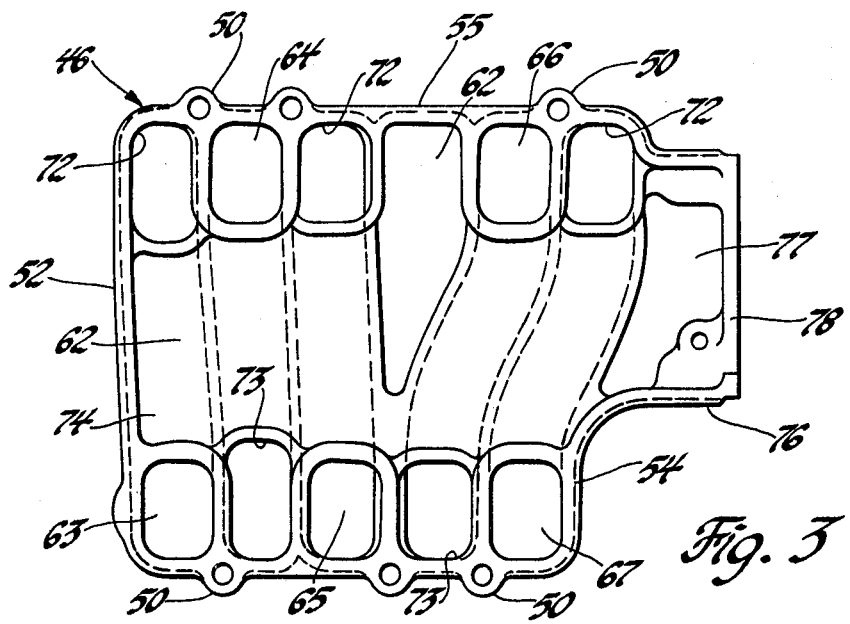
FIG. 3 is a cross-sectional view from the plane indicated by the line 3—3 of FIG. 1 illustrating the manifold upper portion.
Figure 4:
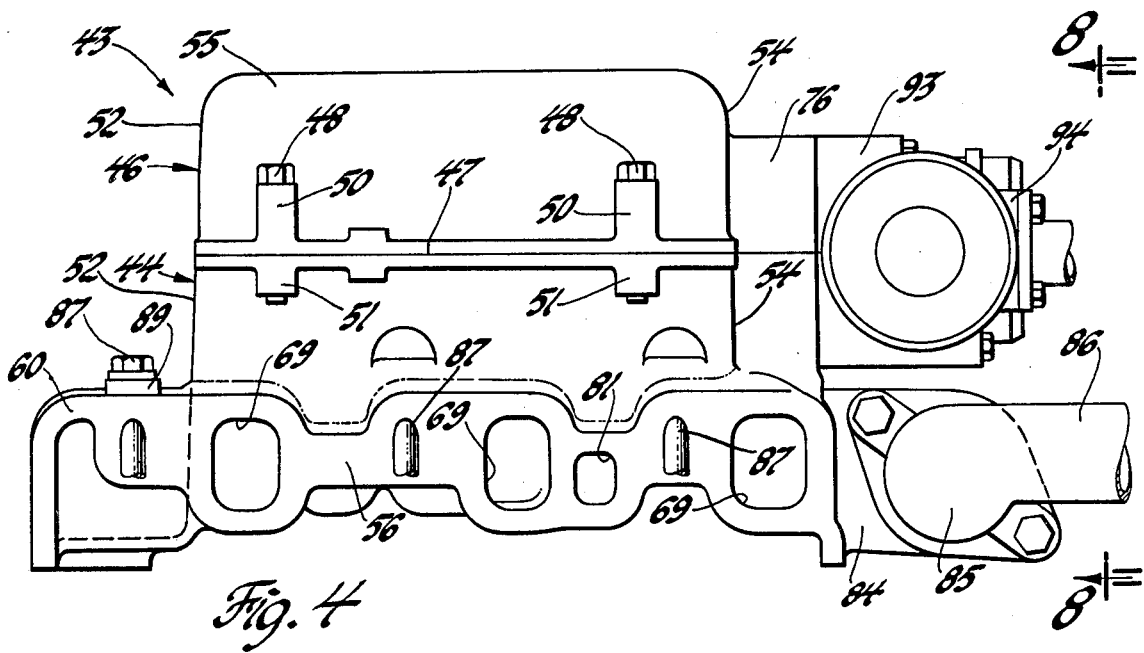
FIG. 4 is a side view of the manifold as seen from the plane indicated by the line 4—4 of FIG. 1.
Figures 5, 6, 7:
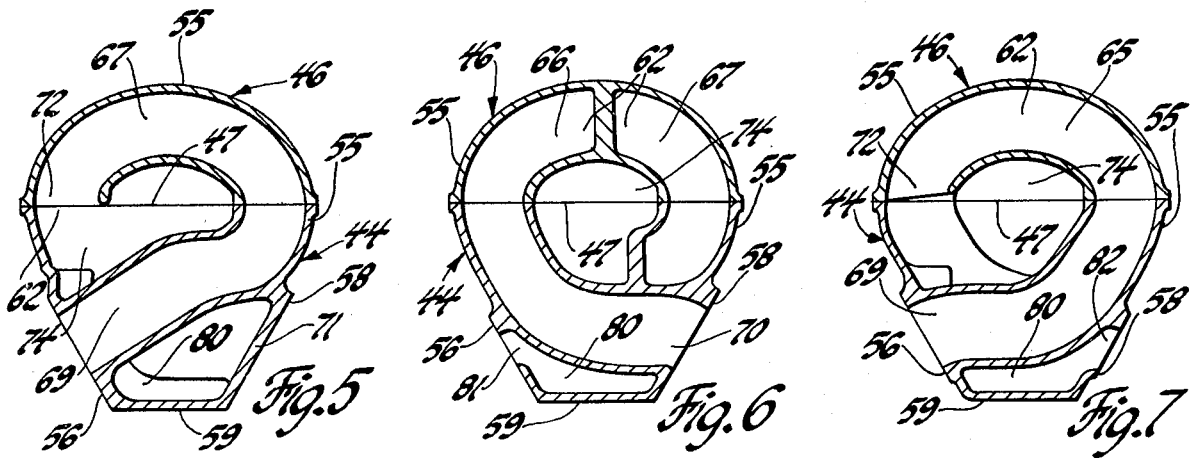
FIG. 5 is an adjusted transverse cross-sectional view from the planes indicated by the lines 5—5 of FIGS. 2 and 4 illustrating the configuration of one of the manifold ram tube passages.
FIG. 6 is a transverse cross-sectional view from the plane indicated by the lines 6—6 of FIGS. 2 and 4 showing various portions of the internal passage structure.
FIG. 7 is an adjusted cross-sectional view from the planes indicated by the lines 7—7 of FIG. 2 showing features including another of the manifold ram tube passages.
Figure 8:
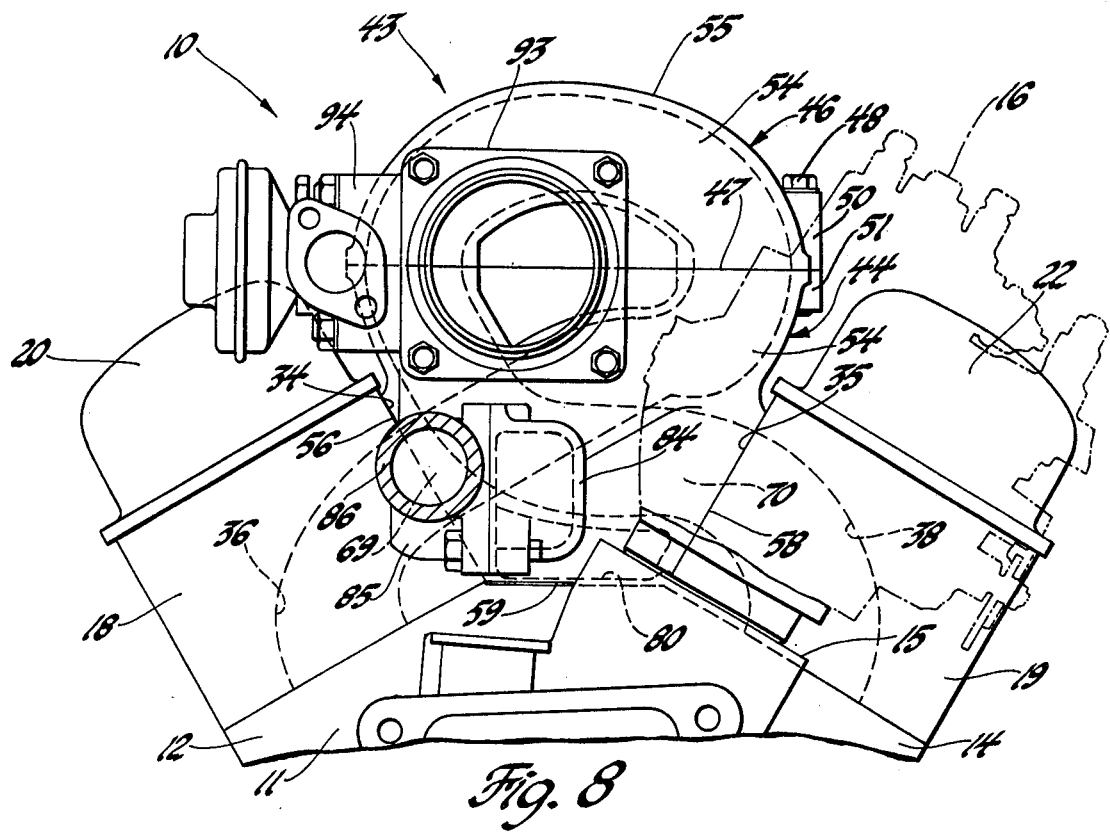
FIG. 8 is a rear end view from the plane indicated by the line 8—8 of FIG. 4 showing the relationships of the manifold and various other engine components.
Figure 9:
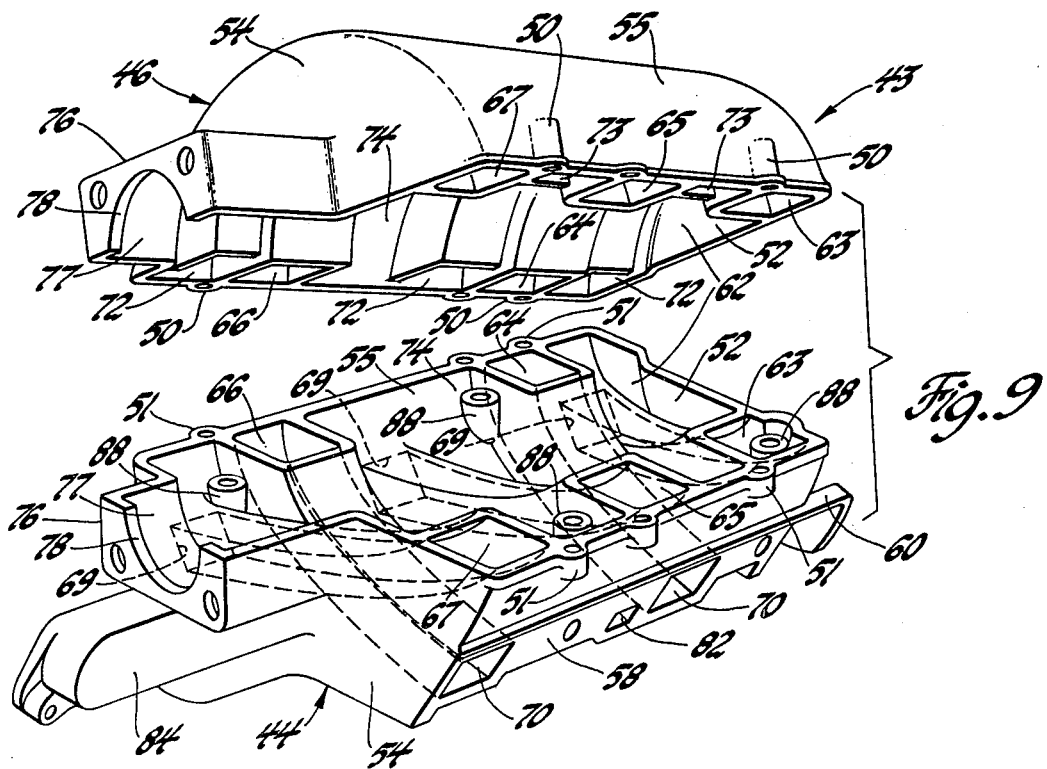
FIG. 9 is an exploded pictorial view showing the main upper and lower sections of the manifold assembly.

Referring now to the drawings in detail, there is shown in illustration of a specific embodiment of the invention an internal combustion engine generally indicated by numeral 10. Engine 10 is a five cylinder 60° V-type diesel engine having features of construction that are disclosed in somewhat more detail in the co-pending U.S. patent application Ser. No. D-6,055 filed contemporaneously with this application and assigned to the assignee of the present invention.

Engine 10 includes a cylinder block 11 defining left and right cylinder banks 12, 14 respectively, arranged with a relative bank angle of 60° and each including a plurality of longitudinally aligned cylinders. In the present embodiment the left cylinder bank 12 defines three in-line cylinders while the right cylinder bank 14 defines only two aligned cylinders lying generally opposite but slightly offset toward the rear of the engine from the front two cylinders of the left bank. A mounting boss 15 supporting a diesel fuel injection pump 16 is provided on the cylinder block behind the right cylinder bank 14 and generally opposite though offset rearwardly, from the rear cylinder of the left bank.

The ends of the cylinders are closed by left and right bank cylinder heads 18, 19 respectively, which are provided with rocker covers 20, 22 respectively. The cylinder heads and their respective rocker covers are considered, from the standpoint of the succeeding description and claims, to be included as part of the respective cylinder banks to which they are attached.

The engine is additionally provided with a number of externally mounted components or accessories including a water pump 23, air conditioning compressor 24, vacuum pump 26, alternating current generator 27 and other pulley connected devices driven through a single serpentine multi-groove drive belt 28 by a pulley 29 mounted on the end 30 of the engine crankshaft. An electrical starter 31 and an oil filter and mounting body 32 are also included as part of the engine package.

On the inner sides of the cylinder banks 12, 14 the cylinder heads 18, 19, forming portions of the banks, have inwardly facing opposite disposed side walls 34, 35 respectively. The left cylinder bank head 18 further includes individual intake ports 36, one connecting with each of the three left bank cylinders which are conventionally numbered 1, 3 and 5 beginning from the front end of the engine at which the belt driven accessories are mounted. Right bank cylinder head 19 includes individual intake ports 38, one connecting with each of the two right bank cylinders numbered 2 and 4 beginning from the front end of the engine. The intake ports 36, 38 open to the vee shaped space between the cylinder banks through their respective side walls 34, 35, defining port inlet openings that are longitudinally spaced along the side walls 34, 35. The port inlet openings of cylinders 2 and 4 are generally opposite those of cylinders 1 and 3 but are offset slightly to the rear thereof in conventional fashion for V-type engines.

Valves and valve gear, not shown, are mounted in the cylinder heads and partially enclosed by the rocker covers. These operate in conventional fashion to control the admission of air to the cylinders from the intake ports 36, 38 as well as the exhaust of burned charges from the cylinders through exhaust ports, not shown, to exhaust manifolds, such as left bank manifold 39, which are mounted on the outboard sides of the cylinder heads of the respective cylinder banks. Fuel is supplied to the engine cylinders by the engine fuel injection pump 16 which connects, through individual fuel lines 40, with injection nozzles 42, mounted in the cylinder heads to spray fuel into the combustion chambers of each of the engine cylinders.

In accordance with the invention, there is mounted in the 60° V defined between the cylinder banks, including their associated cylinder heads, a compact plenum type ram tube engine air intake manifold designed in accordance with the principles of the present invention and generally indicated by numeral 43.

Manifold 43 comprises an assembly of two main components, a base section 44 and the cover section 46. These sections are assembled together along a transverse parting line 47, which lies horizontal as shown in the drawings, and are retained in assembly by bolts 48 extending through drilled bosses 50, 51 in the cover and base sections respectively. Since the manifold sections are preferably made of aluminum or other suitable light material, the bolts are preferably secured by separate nuts or threaded into suitable inserts, not shown, in the bosses 51 of the base section.

While it would be possible if desired to manufacture the manifold assembly as a single element, the coring and other manufacturing methods involved would be rendered substantially more difficult. More importantly, the manifold is preferably provided with a removable cover in order to provide for the arrangement, to be subsequently described, for mounting the manifold assembly on the engine cylinder banks.

The intake manifold 43 including its assembled sections 44, 46 is provided with outer walls including front and rear end walls 52, 54 respectively, and an elongated generally cylindrically curved peripheral wall 55. The latter has a generally elliptical cross section that extends around the top and partially into the bottom section of the manifold where it joins truncated V-shaped side surfaces 56, 58 connected by a flat lower portion 59. The manifold assembly is sized to be located in the V space between the cylinder banks with the side surfaces 56, 58 respectively seated on the left and right bank inner side walls 34, 35 through which the engine cylinder intake ports extend. A front flange portion 60 of the manifold lower section extends forward of the front end wall 52 and provides a cover for the forward portion of the cylinder block V opening.

The manifold outer walls 52, 54, 55 define a generally barrel shaped internal space 62 of slightly downwardly compressed elliptical cross section, deformed to truncated V shape on its lower edges. Within the space 62, internal walls are provided which define five ram tube intake passages 63–67 that are respectively connected with the individual intake ports of cylinders 1–5 of the associated engine. The individual ram intake passages are located immediately inboard of and peripherally coiled along the peripheral wall and extend, one each, to individual left or right outlet openings 69, 70 through the left and right side surfaces 56, 58, respectively, of the manifold. There are three left outlet openings 69 and two right outlet openings 70, all aligned with corresponding intake ports 36, 38 for their associated cylinders.

From cylinders of the opposite banks, alternate ram tube passages extend in oppositely curving sense across the bottom of the space 62, up the opposite side, over the top and down to left or right inlet openings 72, 73 which are located midway down the side at the lower edge of the cover portion interior on the same side of the manifold as the outlet openings for their corresponding ram tube passages. As illustrated, the ram tube intake passages are oppositely curved and interdigitated in and around a central plenum 74 which occupies most of the space 62 that is not taken up by the ram tube passages themselves.

An inlet extension 76 carried on the rear end wall 54 of the manifold and offset to the left side thereof defines an intake conduit 77 for air entering the central plenum. An opening 78 in the end of the intake conduit is adapted to be communicated with an external air source, such as an air cleaner and intake system not shown. The intake conduit is offset to the left side of the manifold in order to leave room for the body of the fuel injection pump, which extends upwardly from the cylinder block on the right side of the engine.

It will noted that the ram intake passages, 63, 65, 67 for the left bank cylinders are coiled within the manifold to direct intake flows in a counterclockwise curving sense, as viewed from the rear, from inlet openings 72 on the manifold left side, around the manifold periphery to the left side outlet openings 70 of their respective passages. The ram intake passages 64, 66 for the right bank cylinders are spaced alternately in a longitudinal direction with the left bank passages and are interdigitated therewith to direct intake flows in a clockwise curving sense from inlet openings 73 on the manifold right side, around the manifold periphery to the right side outlet openings 71 of their respective passages. It should be further noted that the front passages 63 and 64 lie in separate generally parallel transverse planes, while the paths of aft passages 66-68 are nonplanar, due to the relative positions of the respective associated engine intake ports and the need to maintain the right side of the rear manifold wall 54 at a location forward of the rear left bank cylinder number 5, in order to leave room for the fuel injection pump previously mentioned.

Along the bottom of the space 62, underneath the lower portions of the aft ram intake passages, the manifold walls define a coolant passage 80 that connects with inlet openings 81, 82 extending through the side surfaces 56, 58 respectively to connect with coolant passages of the adjacent cylinder heads to receive coolant therefrom. An outlet extension 84, protruding from the rear manifold wall 54 below the air inlet extension 76, defines a coolant conduit connecting with the passage 80 to carry the coolant therefrom after it passes under the aft ram tube passages 65-67. Extension 84 mounts an outlet fitting 85 which constitutes a thermostat housing and provides an outlet conduit 86 for conducting coolant from the assembly. The coolant passage and outlet fitting are formed in the manifold to help provide a compact engine assembly and avoid the need for additional components in the V between banks to conduct coolant from the engine. If desired, insulating means, such as an air space or cast in separator, could be provided between the coolant passage and the adjacent ram intake passages to minimize the conduction of heat between the coolant and the intake air.

Retention of the base section of the manifold on the cylinder heads of the right and left cylinder banks is provided by bolts 87 which extend downwardly through openings in internal bosses 88 and external boss 89 through the manifold side surfaces 56, 58 into the corresponding cylinder head side walls. With this arrangement, the manifold lower section must first be secured to the engine cylinder banks before the upper cover section is assembled with the lower section to complete the manifold assembly.

Provision for the recirculation of exhaust gases to the inlet is also provided for by mounting of an adapter 93 on the rear end of the inlet extension 76 to define a further extension of the intake passage. The adapter 93 supports an exhaust recirculation valve body 94 that provides for the admission of recirculated exhaust gases via conduit means not shown.

By reference to the drawings it may be seen that the just described illustrative embodiment of ram tube plenum type intake manifold provides a very compact structure which mounts in the relatively open space between the cylinder banks of a V-type engine, leaving room for adjacent external engine components. Nevertheless, the compact manifold structure provides an internal space in which relatively long interdigitally coiled ram tubes are located, with remaining internal volume being used as a plenum for feeding the ram intake tubes to define an overall compact manifold arrangement.

While the invention has been described by reference to a particular embodiment chosen for purposes of illustration, it should be recognized that numerous changes could be made within the scope of the inventive concepts disclosed. Accordingly it is intended that the invention not be limited to the described embodiment but that it have the full scope permitted by the language of the following claims.

The embodiments of the invention in which an exclusive property or privilege is claimed are defined as follows:

1. A compact ram tube plenum type intake manifold for an internal combustion engine having V-arranged cylinder banks with opposed inner side walls and spaced cylinder intake ports opening through said walls, said manifold comprising outer walls partially of curved elongated generally cylindrical configuration defining a barrel like space of compact construction sized to be disposed between such engine cylinder banks, two laterally spaced longitudinally extending external mounting surfaces formed on said outer walls along opposite sides of the manifold and adapted to engage the opposed side walls of such engine cylinder banks, and outlet openings through the mounting surfaces and spaced to connect with said cylinder intake ports, internal walls within said outer walls and defining in said barrel like space a central plenum and individual ram intake passages, said passages being located immediately inboard the outer walls and extending in coiled fashion, one from each said outlet opening, to disparate inlet openings from said plenum, those of said passages which open through diverse ones of said mounting surfaces being oppositely curved and interdigitated with each other to direct flows in curving paths of opposite sense to cylinder inlet ports of the opposed cylinder bank side walls, and means defining an intake through said outer walls and connecting with the plenum for providing induction air to the plenum for delivery to the ram tube passages.

2. A compact ram tube plenum type intake manifold for an internal combustion engine having V-arranged cylinder banks with opposed inner side walls and spaced cylinder intake ports opening through said walls, said manifold comprising outer walls of curved elongated partially cylindrical configuration and compact construction sized to be disposed between such engine cylinder banks, said outer walls internally defining the periphery of a barrel like space having a bottom, opposite sides and an upper periphery, two laterally spaced longitudinally extending external mounting surfaces formed on said outer walls along opposite sides of the manifold and adapted to engage the opposed side walls of such engine cylinder banks, said outer walls having outlet openings through the mounting surfaces from adjacent sides of the barrel like space and spaced to be aligned and connect with the cylinder intake ports upon assembly of the manifold to the engine, internal walls within said outer walls and defining in said barrel like space a plenum and individual ram intake passages, said passages being located immediately inboard the outer walls and each extending in coiled fashion peripherally within said space, one from each outlet opening, across the bottom of the space, up the opposite side, across the upper periphery and down to an inlet opening from the space, each said inlet opening being located on the same side of the manifold as the outlet opening of its respective ram intake passage, those of said ram intake passages which open through diverse ones of said mounting surfaces being oppositely curved and interdigitated with each other around a central portion of said plenum to direct flows from the plenum in curving paths of opposite sense through their respective outlet openings to the cylinder intake ports of the opposed cylinder bank walls, and an intake conduit supported on the outer walls and extending longitudinally from one end of the plenum to define an inlet passage connectable with associated induction means for providing induction air to the plenum for delivery to the ram intake passages.

3. The manifold of claim 2 comprising an assembly of separable upper and lower sections with a parting line extending longitudinally through the plenum whereby the manifold is constructed of at least two major components for ease of manufacture and assembly.

4. The manifold of claim 2 and further comprising coolant inlet openings through the external mounting surfaces of said outer walls, coolant outlet means through one end of the outer walls and a coolant passage extending below the ram intake passages and connecting said coolant inlet openings with said coolant outlet means to carry coolant from the engine cylinder banks to external coolant means.

5. The manifold of claim 2 wherein said cylindrically configured outer wall portions are of downwardly compressed generally elliptical shape to minimize overall height of the manifold.

* * * * *